United States Patent
Onoda et al.

(10) Patent No.: US 10,283,308 B2
(45) Date of Patent: May 7, 2019

(54) BUSBAR

(71) Applicant: YAZAKI CORPORATION, Minato-ku, Tokyo (JP)

(72) Inventors: Shinya Onoda, Shizuoka (JP); Yoshinori Ishikawa, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 103 days.

(21) Appl. No.: 14/819,890

(22) Filed: Aug. 6, 2015

(65) Prior Publication Data

US 2015/0340189 A1 Nov. 26, 2015

Related U.S. Application Data

(63) Continuation of application No. PCT/JP2014/053079, filed on Feb. 10, 2014.

(30) Foreign Application Priority Data

Feb. 12, 2013 (JP) ................................. 2013-024729

(51) Int. Cl.
*H01H 85/20* (2006.01)
*H01H 85/10* (2006.01)
(Continued)

(52) U.S. Cl.
CPC .......... *H01H 85/205* (2013.01); *H01H 85/10* (2013.01); *H01H 69/02* (2013.01);
(Continued)

(58) Field of Classification Search
CPC ........ H01H 69/02; H01H 85/10; H01H 85/12; H01H 85/205; H01H 2085/025;
(Continued)

(56) References Cited

U.S. PATENT DOCUMENTS 5,977,859 A * 11/1999 Kawamura .......... H01H 85/044
29/623
2001/0011939 A1* 8/2001 Inaba ................... H01H 85/044
337/265

(Continued)

FOREIGN PATENT DOCUMENTS

JP 61-066386 A 4/1986
JP 06-086830 U 12/1994
(Continued)

OTHER PUBLICATIONS

Shimizu, Google machine translation of WO 2012133459 A1.*
(Continued)

*Primary Examiner* — Jacob R Crum
(74) *Attorney, Agent, or Firm* — Sughrue Mion, PLLC

(57) ABSTRACT

A busbar includes a plurality of main terminals (upstream side terminal, downstream side terminals) and one auxiliary terminal conductively connected to one of the main terminals and is press-formed in an integrated manner. The auxiliary terminal is connected to the main terminals through connection bars which are all cut off, except for one, in a cutting process after a pressing process, and the circuit configuration can be changed by selectively cutting off the connection bars. Therefore, there is no need to change the shape of a press die, and the production efficiency can be improved using a die having a uniform shape.

3 Claims, 3 Drawing Sheets

(51) Int. Cl.
 *H01H 69/02* (2006.01)
 *H01H 85/12* (2006.01)
 *H01H 85/02* (2006.01)
 *H01H 85/055* (2006.01)

(52) U.S. Cl.
 CPC ....... *H01H 85/12* (2013.01); *H01H 2085/025* (2013.01); *H01H 2085/0555* (2013.01)

(58) Field of Classification Search
 CPC ... H01H 2085/0555; H01H 2085/2055; H01H 2085/206
 USPC .................................................. 337/191, 412
 See application file for complete search history.

(56) References Cited

U.S. PATENT DOCUMENTS

| | | | |
|---|---|---|---|
| 2002/0080562 A1 | 6/2002 | Nakamura et al. | |
| 2005/0036260 A1 | 2/2005 | Nakamura et al. | |
| 2006/0170528 A1* | 8/2006 | Fukushige | H01H 85/0411 337/297 |
| 2010/0315192 A1* | 12/2010 | Onoda | H01H 85/10 337/163 |
| 2012/0293295 A1* | 11/2012 | Kibushi | H01H 85/044 337/142 |
| 2013/0027174 A1* | 1/2013 | Masuda | H01H 85/0241 337/142 |
| 2013/0126204 A1 | 5/2013 | Nohara | |
| 2013/0316584 A1* | 11/2013 | Taguchi | H01H 69/02 439/620.26 |

FOREIGN PATENT DOCUMENTS

| | | | | |
|---|---|---|---|---|
| JP | 11-104753 A | | 4/1999 | |
| JP | 2001273848 A | * | 10/2001 | ........... H01H 85/044 |
| JP | 2003-009350 A | | 1/2003 | |
| JP | 2003-079030 A | | 3/2003 | |
| JP | 2010-170721 A | | 8/2010 | |
| JP | 2010182578 A | * | 8/2010 | |
| JP | 2012-034486 A | | 2/2012 | |
| JP | WO 2012133459 A1 | * | 10/2012 | ............. H01H 69/02 |

OTHER PUBLICATIONS

Yamaguchi, EPO machine translation of JP 2010182578 A.*
Inaba, EPO machine translation of JP 2001273848 A.*
Communication dated Nov. 1, 2016, from the Japanese Patent Office in counterpart Japanese application No. 2013-024729.
International Search Report for PCT/JP2014/053079 dated Apr. 15, 2014 [PCT/ISA/210].
Communication dated May 30, 2017, issued by the Japanese Patent Office in counterpart Japanese application No. 2013-024729.

* cited by examiner

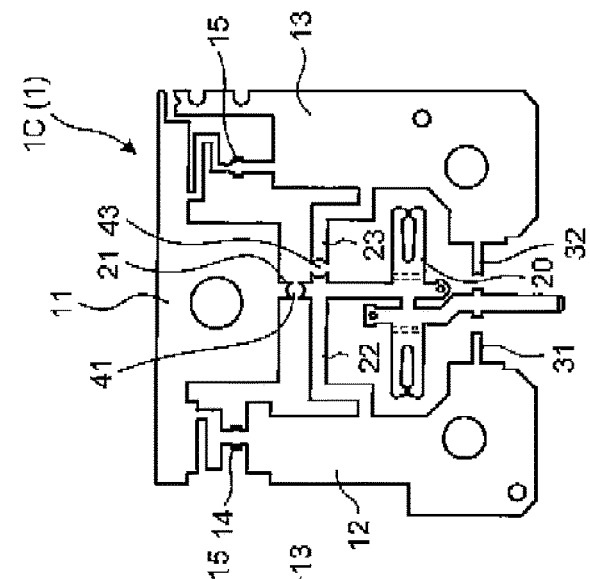
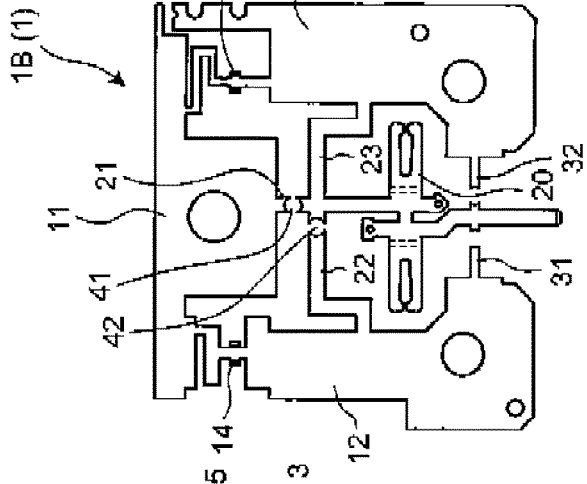
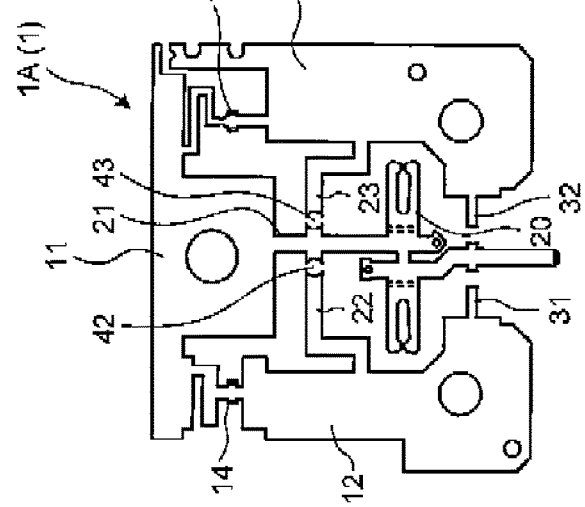

FIG.3A
FIG.3B
FIG.3C
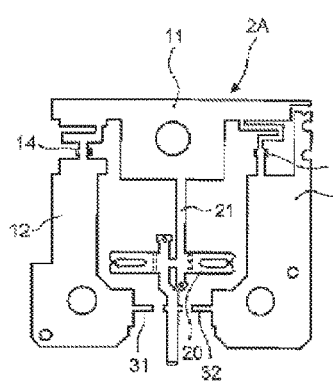
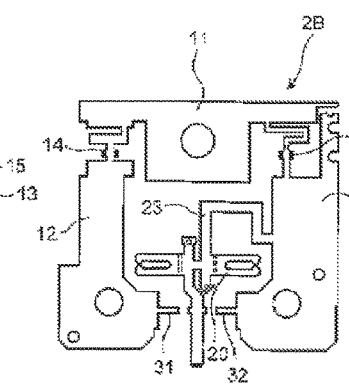
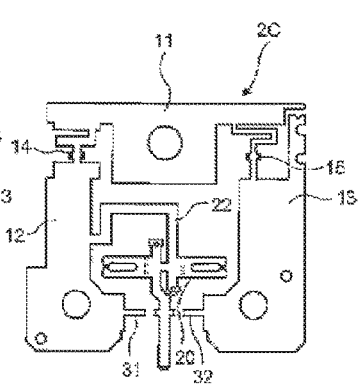

BUSBAR

CROSS-REFERENCE TO RELATED APPLICATION

This application is a continuation application of International Application PCT/JP2014/053079, filed on Feb. 10, 2014, and designating the U.S., the entire contents of which are incorporated herein by reference.

BACKGROUND OF THE INVENTION

1. Field of the Invention

The present invention relates to a busbar for circuit configuration of a fusible link interposed mainly between an on-vehicle battery and a load side device.

2. Description of the Related Art

The fusible link interposed between an on-vehicle battery and a load side device in a vehicle generally includes a plurality of branch circuits connected to a plurality of loads so as to protect a circuit by a fuse in each branch circuit. In this case, one press-formed busbar is used as a wiring substrate constituting a circuit from one power source side terminal (corresponding to an upstream side terminal positioned on the upstream side of a current flowing direction) to a plurality of branch load side terminals (corresponding to downstream side terminals positioned on the downstream side of the current flowing direction) through fuse elements having a fuse function.

Conventionally, the busbar has been produced by a process in which sequentially-conveyed metal plates are placed on a placing table and press-formed by a pressing device. In such a production process, when the specifications of a vehicle are different, for example, the shape of a die of the pressing device is changed to produce busbars for circuit configurations corresponding to the different specifications, as described in Japanese Patent Application Laid-open No. 11-104753.

However, when the shape of a die for press-forming a busbar is changed according to a difference of the specifications of a vehicle, the production is inefficiency because the work is troublesome and requires costs and time.

SUMMARY OF THE INVENTION

It is an object of the present invention to at least partially solve the problems in the conventional technology.

In view of the above-described problem, the present invention aims at providing a busbar capable of improving the production efficiency using a die having a uniform shape without a need to change the shape of a press die.

In order to solve the above mentioned problem and achieve the object, a busbar according to one aspect of the present invention includes a plurality of main terminals; and one auxiliary terminal conductively connected to one of the rain terminals, the busbar being press-formed in an integrated manner, wherein the auxiliary terminal is connected to each of the main terminals through connection bars which are all cut off, except for one, in a cutting process after a pressing process.

With the busbar having the above-described configuration, it is possible, with a simple process in which the connection bars as a part of the press-formed busbar having a uniform shape are selectively cut off in the cutting process after the pressing process, to easily obtain a busbar for a plurality of kinds of circuit configurations in which the main terminal conductively connected to the auxiliary terminal is changed. Therefore, a plurality of variations of busbars can be provided with low costs while improving the production efficiency by standardizing the shape of a die for press-forming the busbars.

Further, in the busbar according to another aspect of the present invention, it is possible to configure that the main terminals include an upstream side terminal positioned on an upstream side in a current flowing direction, and a plurality of downstream side terminals positioned on a downstream side in the current flowing direction than the upstream side terminal and connected to the upstream side terminal through separate fuse elements with different rated currents, and the auxiliary terminal is connected to each of the upstream side terminal and the downstream side terminals through the connection bars.

With the busbar having the above-described configuration, in the circuit configuration with the upstream side terminal and the downstream side terminals connected to the upstream side terminal through the separate fuse elements having different rated currents, it is possible to change a rated current when using the auxiliary terminal by changing the main terminal (upstream side terminal and downstream side terminal) conductively connected to the auxiliary terminal.

Further, in the busbar according to still another aspect of the present invention, it is possible to configure that the one upstream side terminal and the two downstream side terminals are disposed to be a U-shape in a planer view so that the upstream side terminal is positioned in center, the auxiliary terminal is disposed between the two downstream side terminals provided to face each other, a cross-shaped connection plate extending from the auxiliary terminal and branching to three connection bars is disposed in a space surrounded by the upstream side terminal, the downstream side terminals, and the auxiliary terminal, and respective ends of the three connection bars of the connection plate are connected to the one upstream side terminal and the two downstream side terminals.

With the busbar having the above-described configuration, it is possible to easily select a plurality of circuit configurations although the configuration is compact. In particular, the three connection bars may be cut off in the vicinity of a branch point of the connection bars. Thus, it is possible to concentrate cutting operation portions in a small area when cutting off the connection bars by punching with a punch or when cutting off the connection bars by laser radiation, thereby improving workability.

Further, in the busbar according to still another aspect of the present invention, it is possible to configure that the two downstream side terminals provided to face each other and the auxiliary terminal are connected to each other through reinforcement bars disposed on a side opposite to the connection plate and cut off in the cutting process after the pressing process.

With the busbar having the above-described configuration, the busbar can be press-formed in the state where the auxiliary terminal is connected to the both-side downstream side terminals through the reinforcement bars. Thus, it is possible to prevent unnecessary deformation of the auxiliary terminal due to external force when handled.

The present invention has been described briefly in the above. The details of the present invention will be more apparent from the following description (hereinafter, referred to as an "embodiment"), when read with reference to the accompanying drawings.

BRIEF DESCRIPTION OF THE DRAWINGS

FIGS. 2A to 2C are plan views illustrating the configurations of three kinds of busbars with different circuit configurations that are formed by selectively punching connection bars in press-formed busbars of the embodiment; and FIGS. 3A to 3C are diagrams illustrating comparative examples with respect to the busbars of FIGS. 2A to 2c, respectively, and are plan views illustrating the forms of three kinds of busbars when press-formed individually with a different shape of a die, in the conventional manner.

DETAILED DESCRIPTION OF THE PREFERRED EMBODIMENTS

Figure 1:
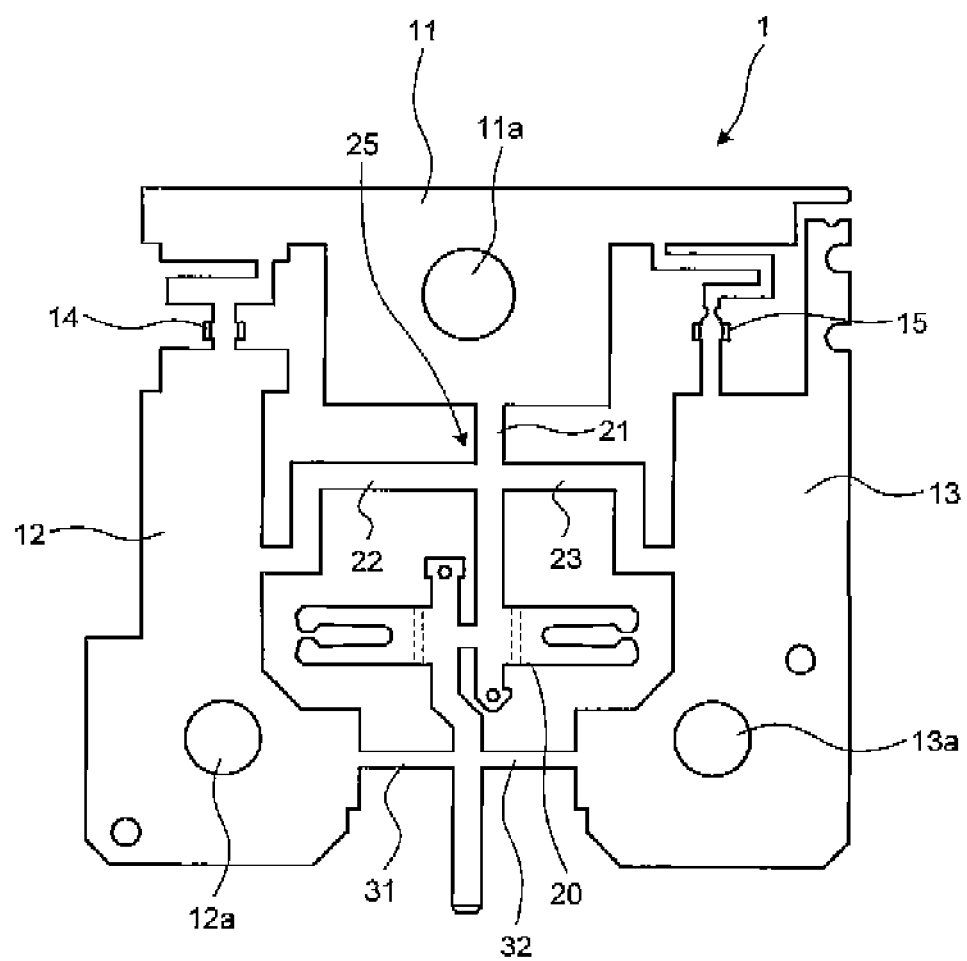
FIG. 1 is a plan view of a busbar according to as embodiment of the present invention.

In the following, an embodiment of the present invention will be described with reference to the drawings.

FIG. 1 is a plan view of a busbar according to an embodiment, and FIGS. 2A to 2C are plan views illustrating the configurations of three kinds of busbars with different circuit configurations that are formed by selectively punching connection bars in the press-formed busbars of the embodiment.

As illustrated in FIG. 1, a busbar 1 of the embodiment is a busbar used for circuit configuration of a fusible link interposed between an on-vehicle battery and a load side device in a vehicle. The busbar 1 is press-formed to include an upstream side terminal 11 and downstream side terminals 12, 13 as a plurality of main terminals, and an auxiliary terminal 20 conductively connected to one terminal among the upstream side terminal 11 and the downstream side terminals 12, 13 in an integrated manner.

One upstream side terminal 11 and two downstream side terminals 12, 13 are provided. The upstream side terminal 11 and the downstream side terminals 12, 13 are disposed in a U shape in a planar view so that the upstream side terminal 11 is positioned in the center. Moreover, the auxiliary terminal 20 is disposed between the two downstream side terminals 12, 13 provided to face each other.

The upstream side terminal 11 is connected to a power supply side so as to be positioned on the upstream side in a current flowing direction, and is connected to a positive electrode of the on-vehicle battery through a bolt insertion hole 11a. Moreover, the downstream side terminals 12, 13 are connected to a load side so as to be positioned on the downstream side in the current flowing direction than the upstream side terminal 11. The downstream side terminals 12, 13 are connected to the upstream side terminal 11 through separate fuse elements 14, 15 with different rated currents, and are connected to a load side circuit using bolt insertion holes 12a, 13a, respectively.

The downstream side terminal 12 on the left side in FIG. 1 is connected to the upstream side terminal 11 through the fuse element 14 with a rated current value set to be high, and thus can be referred to as a high-current-side downstream side terminal. Moreover, the downstream side terminal 13 on the right side in FIG. 1 is connected to the upstream side terminal 11 through the fuse element 15 with a rated current value set to be lower than that of the fuse element 14, and thus can be referred to as a low-current-side downstream side terminal.

Then, the auxiliary terminal 20 between the left and the right downstream side terminals 12, 13 is connected to each of the upstream side terminal 11 and the downstream side terminals 12, 13 through connection bars 21, 22, 23 all cut off, except for one, in a cutting process after a pressing process. To be more specific, a cross-shaped connection plate 25 extending from the auxiliary terminal 20 and branching to the three connection bars 21, 22, 23 is disposed in space surrounded by the upstream side terminal 11, the downstream side terminals 12, 13, and the auxiliary terminal 20, and respective ends of the three connection bars 21, 22, 23 of the connection plate 25 are connected to one upstream side terminal 11 and two downstream side terminals 12, 13.

Moreover, in the busbar 1, the two downstream side terminals 12, 13 provided to face each other and the auxiliary terminal 20 are connected to each other through reinforcement bars 31, 32 disposed on the side opposite to the connection plate 25 and cut off in the cutting process after the pressing process.

When the busbar 1 having such a configuration is used, busbars 1A, 1B, 1C for a plurality of kinds of circuit configurations are formed in which the main terminal (upstream side terminal 11 and downstream side terminals 12, 13) conductively connected to the auxiliary terminal 20 is changed by selectively cutting off the connection bars 21, 22, 23 as a part of the press-formed busbar 1 having a uniform shape in the cutting process (punching process or laser cutting process, etc.) after the pressing process, as illustrated in FIGS. 2A to 2C. That is, the connection bars 21, 22, 23 are all cut off, except for one, in the cutting process after the pressing process in which the busbar 1 is press-formed in the state where the auxiliary terminal 20 is connected to each of the upstream side terminal 11 and the downstream side terminals 12, 13 as main terminals through the connection bars 21, 22, 23, whereby the busbar 1 can have a plurality of kinds of circuit configurations. Furthermore, in the busbar 1, a cutting portion is provided onto all of the connection bars 21, 22, 23 except for one, that connect the auxiliary terminal 20 to each of the upstream side terminal 11 and the downstream side terminals 12, 13 as main terminals, as described below. In this manner, the busbar 1 can be used as an equivalent of each of the busbars 2A to 2C formed using dies with different shapes, as illustrated in FIGS. 3A to 3C.

In the example illustrated in FIG. 2A, both of the connection bars 22, 23 connected to the two downstream side terminals 12, 13 are cut off (cutting portions are represented by symbols 42, 43) and only the connection bar 21 connected to the upstream side terminal 11 is left, thereby forming the busbar 1A having a circuit configuration in which the auxiliary terminal 20 is conductively connected to the upstream side terminal 11 through the connection bar 21. In this case, the auxiliary terminal 20 can be used as a terminal with the same rated current as that of the upstream side terminal 11.

FIG. 3A illustrates the busbar 2A press-formed using a dedicated die. In the busbar 2A, the auxiliary terminal 20 is conductively connected to the upstream side terminal 11 through the connection bat 21. The busbar 1A illustrated in the above FIG. 2A can be used as an equivalent of the busbar 2A by selectively cutting off the connection bars 21 to 23.

In the example illustrated in FIG. 2B, both of the connection bar 21 connected to the upstream side terminal 11 and the connection bar 22 connected to the high-current-side downstream side terminal 12 are cut off (cutting portions are represented by symbols 41, 42) and only the connection bar 23 connected to the low-current-side downstream side terminal 13 is left, thereby forming the busbar 1B having a circuit configuration in which the auxiliary terminal 20 is conductively connected to the low-current-side downstream side terminal 13 through the connection bar 23. In this case, the auxiliary terminal 20 can be used as a terminal with the same low rated current as that of the downstream side terminal 13.

FIG. 3B illustrates the busbar 2B press-formed using a dedicated die. In the busbar 2B, the auxiliary terminal 20 is conductively connected to the downstream side terminal 13 through the connection bar 23. The busbar 1B illustrated in the above FIG. 2B can be used as an equivalent of the busbar 2B by selectively cutting off the connection bars 21 to 23.

In the example illustrated in FIG. 2C, both of the connection bar 21 connected to the upstream side terminal 11 and the connection bar 23 connected to the low-current-side downstream side terminal 13 are cut off (cutting portions are represented by symbols 41, 43) and only the connection bar 22 connected to the high-current-side downstream side terminal 12 is left, thereby forming the busbar 10 having a circuit configuration in which the auxiliary terminal 2C is conductively connected to the high-current-side downstream side terminal 12 through the connection bar 22. In this case, the auxiliary terminal 20 can be used as a terminal with the same high rated current as that of the downstream side terminal 12.

FIG. 3C illustrates the busbar 2C press-formed using a dedicated die. In the busbar 2C, the auxiliary terminal 20 is conductively connected to the downstream side terminal 12 through the connection bar 22. The busbar 1C illustrated in the above FIG. 2C can be used as an equivalent of the busbar 2C by selectively cutting off the connection bars 21 to 23.

In this manner, when the connection bars 21, 22, 23 are selectively cut off, the busbars 1A, 1B, and 1C having three kinds of circuit configurations in which the main terminal conductively connected to the auxiliary terminal 20 is changed can be easily obtained. Therefore, it is possible to provide a plurality of variations of busbars 1A to 1C with low costs while improving the production efficiency by standardizing the shape of a die for press-forming the busbars.

Moreover, according to the busbar 1 of the embodiment, it is possible to change a rated current when using the auxiliary terminal 20 by changing the main terminal (upstream side terminal 11 and downstream side terminals 12, 13) conductively connected to the auxiliary terminal 20.

Moreover, in the busbar 1 of the embodiment, the upstream side terminal 11 and the downstream side terminals 12, 13 are disposed in a U-shape in a planar view, and the auxiliary terminal 20 is disposed between the downstream side terminals 12, 13 provided to face each other. In addition, the cross-shaped connection plate 25 is disposed in the space surrounded by the upstream side terminal 11, the downstream side terminals 12, 13, and the auxiliary terminal 20, and the respective ends of the three connection bars 21 to 23 of the connection plate are connected to the upstream side terminal 11 and the both-side downstream side terminals 12, 13. Therefore, it is possible to easily select a plurality of circuit configurations although the configuration is compact.

In particular, in the busbar 1 of the embodiment, the three connection bars 21 to 23 may be cut off in the vicinity of a branch point of the connection bars 21 to 23. Thus, it is possible to concentrate cutting operation portions in a small area when cutting off the connection bars 21 to 23 by punching with a punch or when cutting off the connection bars 21 to 23 by laser radiation, thereby improving workability.

Moreover, in the embodiment, the busbar 1 can be press-formed in the state where the auxiliary terminal 20 is connected to the both-side downstream side terminals 12, 13 through the reinforcement bars 31, 32. Thus, it is possible to prevent unnecessary deformation of the auxiliary terminal 20 due to external force when handled.

Note that the present invention is not limited to the above-described embodiment, and modifications, improvement, and the like can be made appropriately. In addition, the material, the shape, the size, the number, the arrangement position, and the like of each component in the above-described embodiment are arbitrary as long as the present invention can be achieved, and are not limited.

For example, the above-described embodiment illustrates the case in which two downstream side terminals 12, 13 are provided. However, only one, or three or more downstream side terminals may be provided.

Moreover, the above-described embodiment illustrates the case in which the auxiliary terminal 20 is connected to all of the one upstream side terminal 11 and the two downstream side terminals 12, 13 through the connection bars 21 to 23. However, the auxiliary terminal may be connected to only two terminals in any combination through the connection bars.

Here, each of the characteristics of the above-mentioned embodiment of the busbar according to the present invention will be summarized concisely in the following [1] to [4].

[1] A busbar (1) includes a plurality of main terminals (11, 12, 13) and one auxiliary terminal (20) conductively connected to one of the main terminals (11, 12, 13) and is press-formed in an integrated manner, in which the auxiliary terminal (20) is connected to each of the main terminals (11, 12, 13) through connection bars (21, 22, 23) which are all cut off, except for one, in a cutting process after a pressing process.

[2] The busbar (1) according to the above-described [1], in which the main terminals include an upstream side terminal (11) positioned on the upstream side in a current flowing direction, and a plurality of downstream side terminals (12, 13) positioned on the downstream side in the current flowing direction than the upstream-side terminal (11) and connected to the upstream side terminal (11) through separate fuse elements (14, 15) with different rated currents, and the auxiliary terminal (20) is connected to each of the upstream side terminal (11) and the downstream side terminals (12, 13) through the connection bars (21, 22, 23).

[3] The busbar (1) according to the above-described [2], in which the one upstream side terminal (11) and the two downstream side terminals (12, 13) are disposed to be a U-shape in a planer view so that the upstream side terminal (11) is positioned in the center, the auxiliary terminal (20) is disposed between the two downstream side terminals (12, 13) provided to face each other, a cross-shaped connection plate (25) extending from the auxiliary terminal 20 and branching to the three connection bars (21, 22, 23) is disposed in a space surrounded by the upstream side terminal (11), the downstream side terminals (12, 13), and the auxiliary terminal (20), and the respective ends of the three connection bars (21, 22, 23) of the connection plate (25) are connected to the one upstream side terminal (11) and the two downstream side terminals (12, 13).

[4] The busbar (1) according to the above-described [3], in which the two downstream side terminals (12, 13) provided to face each other and the auxiliary terminal (20) are connected to each other through reinforcement bars (31, 32) disposed on the side opposite to the connection plate (25) and cut off in the cutting process after the pressing process.

According to the present invention, it is possible to provide a plurality of variations of busbars with low costs while improving the production efficiency by standardizing the shape of a die for press-forming the busbars.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A busbar comprising:
   a plurality of main terminals; and
   one auxiliary terminal conductively connected to one of the main terminals, the busbar being press-formed in an integrated manner, wherein
   the main terminals include an upstream side terminal positioned on an upstream side in a current flowing direction, and a plurality of downstream side terminals positioned on a downstream side in a current flowing direction from the upstream side terminal and connected to the upstream side terminal through separate fuse elements with different rated currents,
   the auxiliary terminal is directly connected to only the plurality of downstream side terminals through connection bar which are all cut off, except for one of the connections bars connected to one of the plurality of downstream side terminals, in a cutting process after a pressing process, such that the auxiliary terminal is electrically connected to the upstream side terminal only via the one of the plurality of downstream side terminals, and
   a plurality of kinds of circuit configurations are formable by cutting off the connection bars and changing a conduction between the auxiliary terminal and the main terminals.

2. The busbar according to claim 1, wherein
   the one upstream side terminal and the two downstream side terminals, from among the plurality of downstream side terminals, are disposed to be a U-shape in a planer view so that the upstream side terminal is positioned in center and the two downstream side terminals are provided to face each other,
   the auxiliary terminal is disposed between the two downstream side terminals,
   a cross-shaped connection plate extending from the auxiliary terminal and branching to two cut connections bars and one non-cut connection bar is disposed in a space surrounded by the upstream side terminal, the downstream side terminals, and the auxiliary terminal, and
   respective ends of the two cut connection bars of the connection plate are connected to one side of the downstream side terminal and the one upstream side terminal, and end of the one non-cut connection bar of the connection plate is connected to the other side of the downstream side terminals.

3. The busbar according to claim 2, wherein
   the two downstream side terminals provided to face each other and the auxiliary terminal are connected to each other through reinforcement bars disposed on a side opposite to the connection plate and out off in the cutting process after the pressing process.

* * * * *